US010532933B2

(12) United States Patent
Bell et al.

(10) Patent No.: US 10,532,933 B2
(45) Date of Patent: Jan. 14, 2020

(54) ENVIRONMENTAL WASTE WATER FILTERING SYSTEM

(71) Applicants: Bryce Paul Bell, San Diego, CA (US); Tom Bell, San Diego, CA (US)

(72) Inventors: Bryce Paul Bell, San Diego, CA (US); Tom Bell, San Diego, CA (US)

(*) Notice: Subject to any disclaimer, the term of this patent is extended or adjusted under 35 U.S.C. 154(b) by 165 days.

(21) Appl. No.: 15/470,366

(22) Filed: Mar. 27, 2017

(65) Prior Publication Data

US 2018/0272256 A1    Sep. 27, 2018

(51) Int. Cl.
| | | |
|---|---|---|
| *C02F 1/00* | (2006.01) | |
| *B67C 11/02* | (2006.01) | |
| *B01D 29/27* | (2006.01) | |
| *C02F 103/12* | (2006.01) | |

(52) U.S. Cl.
CPC .............. *C02F 1/001* (2013.01); *B01D 29/27* (2013.01); *B67C 11/02* (2013.01); *B01D 2201/24* (2013.01); *C02F 2103/12* (2013.01)

(58) Field of Classification Search
CPC ........ B01D 29/90; B01D 29/27; B01D 29/56; B01D 2201/4092; B01D 2201/30; C02F 1/001; C02F 2103/12; B67C 11/02
See application file for complete search history.

(56) References Cited

U.S. PATENT DOCUMENTS

| | | | | |
|---|---|---|---|---|
| 2,767,744 A | * | 10/1956 | Beerman | B65B 3/04 141/319 |
| 3,282,547 A | * | 11/1966 | Ables | A47B 43/006 248/217.1 |
| 4,204,966 A | | 5/1980 | Morgan, Jr. | |
| 4,205,710 A | * | 6/1980 | Dunicz | E03C 1/26 141/286 |
| 5,059,319 A | | 10/1991 | Welsh | |
| 5,078,872 A | * | 1/1992 | Durant | B01D 29/085 210/232 |
| D350,900 S | | 9/1994 | Goetz | |
| D352,143 S | | 11/1994 | Arshinoff | |
| 5,513,770 A | | 5/1996 | Seeley et al. | |
| D430,459 S | | 9/2000 | Conti | |
| 6,164,481 A | * | 12/2000 | Geeham | B44D 3/12 220/321 |
| 6,264,072 B1 | * | 7/2001 | Johannes | B44D 3/12 222/460 |
| 7,025,880 B2 | | 4/2006 | Lamb | |

(Continued)

*Primary Examiner* — Liam Royce
(74) *Attorney, Agent, or Firm* — Gary L. Eastman, Esq.; Eastman McCartney Dallmann LLP

(57) ABSTRACT

An environmental waste water filtering system, including a bucket, the inside of which tapers into a funnel portion that leads to a strainer. The funnel has an exit tube that extends 3 inches below the bucket wall and may be inserted into a drain such as a toilet drain pipe. The inside of the bucket and funnel portion forms a fluid debris chamber. When fluid containing particulate matter is poured into the fluid debris chamber, the particulate matter is removed from the fluid portion as the fluid passes through the strainer and then into the toilet drain pipe. Once all fluid drains from the fluid debris chamber, the captured debris may be poured into a trash bag and disposed of. Optionally, a disposable straining filter bag may be positioned in the fluid debris chamber so that even finer particulate matter is removed from the fluid for disposal with the bag.

9 Claims, 4 Drawing Sheets

(56) References Cited

U.S. PATENT DOCUMENTS

| | | | |
|---|---|---|---|
| D545,519 S | 6/2007 | King | |
| 2003/0106608 A1* | 6/2003 | Walter | B67C 11/02 141/331 |
| 2012/0187034 A1* | 7/2012 | Shaw | B01D 29/05 210/201 |
| 2016/0023878 A1* | 1/2016 | Stevenson | B67C 11/02 141/340 |

* cited by examiner

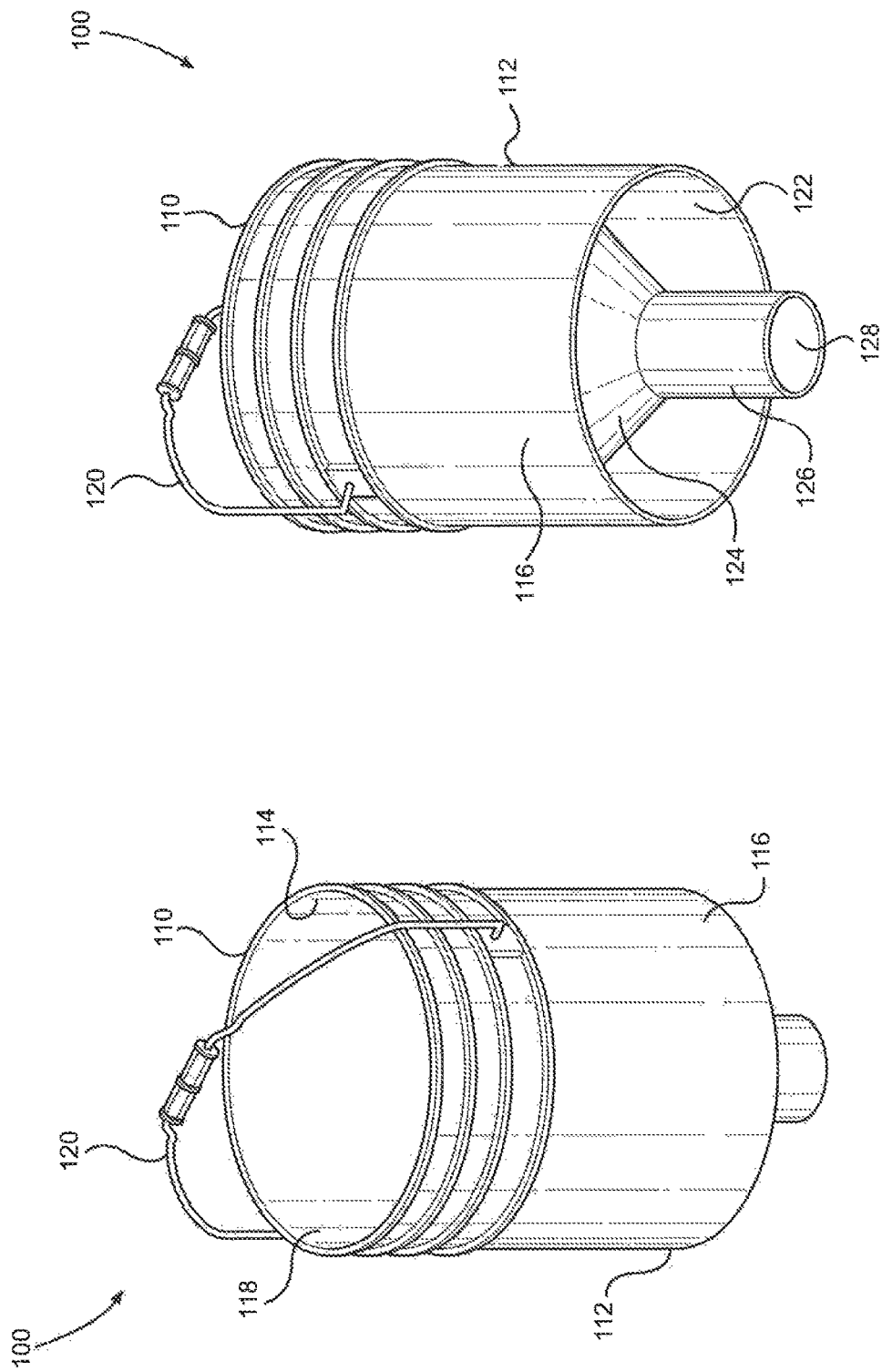

ENVIRONMENTAL WASTE WATER FILTERING SYSTEM

FIELD OF INVENTION

The present invention is directed to the construction industry, and is particularly applicable to aspects of the industry which require the elimination of fluid construction debris in which the materials within the fluid comprise water and particulate matter.

BACKGROUND OF INVENTION

Elimination of fluid construction debris, in which the materials within the fluid comprise water and particulate matter, is an issue in the construction industry. A specific example of this type of construction debris occurs in the tile industry. For instance, during the installation of ceramic tile, small pieces of tile are cut or chipped from larger tiles, and may find their way into the bucket of water used to clean the tiles. Also, when applying gritty substances such as mortar and grout, sponges and trowels are used to smooth the substances, and then rinsed off in a bucket of water. In these applications, the bucket of water collects sediment from the sponges and trowels.

Due to the heightened awareness and concern for environmental contaminates, the water from the cleaning bucket can not be dumped outside where the water would evaporate leaving a very fine powder. Notwithstanding the environmental limitations, homeowners rarely are accepting of the waste water being dumped on their properties.

One solution to the challenge of finding a suitable manner for eliminating the sediment-filled water is to dump the wastewater down the drain. While avoiding the environmental concerns of outside dumping, this method of elimination is not without its own problems. Specifically, when dumping water down drains which contains construction sediment, there is a risk of blocking the drains. This risk is increased when the sediment is actually mortar or adhesive grout that contains cement. In fact, the dumping of cement and grout down drains has resulted in the complete blockage of a drain requiring very expensive demolition and repair of the building's drain system, The present invention addresses the challenges outlined above by providing a mechanism for the elimination of fluid construction debris while avoiding the environmental challenges, as well as preventing the damage to drain systems.

SUMMARY OF THE INVENTION

The environmental waste water filtering system of the present invention includes a bucket, the inside of which tapers into a funnel portion that leads to a strainer. The exit tube of the funnel extends about 3 inches below the plastic bucket wall and may be inserted into a drain such as a toilet drain pipe. The inside of the bucket and funnel portion forms a fluid debris chamber. When fluid containing particulate matter is poured into the fluid debris chamber, the particulate matter is removed from the fluid portion as the fluid passes through the strainer, and then into the toilet drain pipe. Once all fluid drains from the fluid debris chamber, the captured debris may be poured into a trash bag and disposed of properly. Optionally, a disposable straining filter bag may be positioned in the fluid debris chamber so that even finer particulate matter is removed from the fluid for disposal with the bag. Another embodiment of the invention uses a bucket that is cylindrical instead of tapered. In preferred embodiments, the bottom of the bucket is large enough to sit around a drain with a toilet flange. The funnel has a neck high enough so that the exit tube is inserted into the drain without any part of the environmental waste water filtering system touching the toilet flange.

BRIEF DESCRIPTION OF DRAWINGS

The aforementioned and other advantages of the environmental waste water filtering system of the present invention will become more apparent to those skilled in the art upon making a thorough review and study of the following detailed description of the invention when reviewed in conjunction with the drawings in which like references numerals refer to like parts, and wherein:

FIG. 1 is a top perspective view of an environmental waste water filtering system of the present invention, showing the bucket, and exit tube;

FIG. 2 is a bottom perspective view the environmental waste water filtering system of the present invention, showing the bucket, funnel, and exit tube;

DETAILED DESCRIPTION OF THE INVENTION

Figure 4:
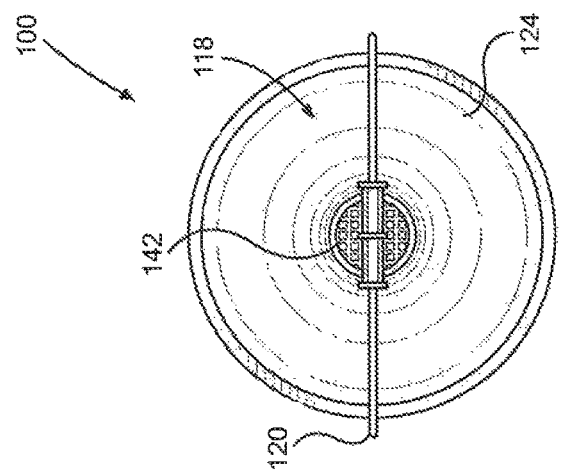
FIG. 4 is a top view of the environmental waste water filtering system of the present invention, showing the opening of the bucket, funnel and strainer.

Referring initially to FIG. 1, a perspective view of a preferred embodiment of the environmental waste water filtering system of the present invention is shown and generally designated 100. The device 100 includes a plastic bucket 110 having a wall 112 with an inside surface 114 and an outside surface 116, and a top opening 118. Some embodiments also include a handle 120 for convenience in carrying and positioning the bucket 110.

FIG. 2 shows a bottom perspective view of the environmental waste water filtering system 100. The bucket 110 is shown to have a bottom opening 122, a funnel 124, and an exit tube 126 extending below the bottom opening 122. An exit 128 at the bottom of the exit tube 126 allows fluid to escape from the bucket 110 into a drain. The funnel 124 may be integral to the bucket 110, or, alternatively, may be a separate piece permanently or removably affixed to the bucket 110. In the latter case, the funnel 124 would have a flange 125 (shown in FIG. 3) extending downward from its upper circumference, which would sit flush against the inside surface 114 of the bucket 110. The flange may be affixed to the inside surface 114 using epoxy, rivets, or other adhesive or fasteners known in the art. Any gap between the flange 125 and the inside surface 114 would be caulked in order to prevent fluid from flowing down between the flange and the inside surface 114 of the bucket 110. In a preferred embodiment, the bucket 110 and funnel 124 are made of plastic, but they may be made of other material having similar strength, including but not limited to metal, ceramic, or wood.

Figure 3:
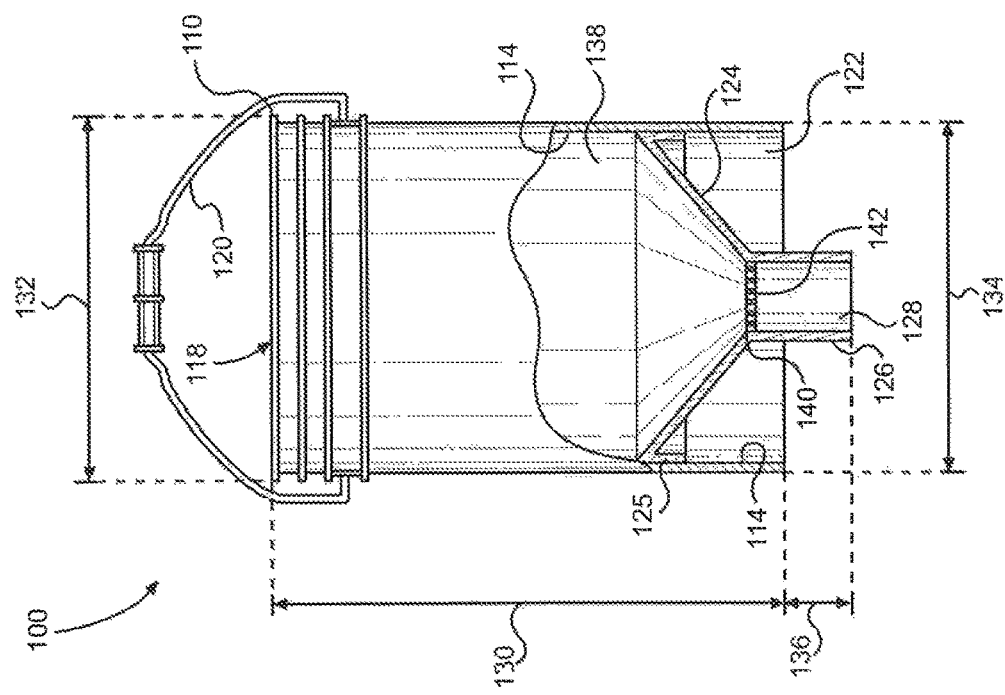
FIG. 3 is a cutaway side view of environmental waste water filtering system of the present invention, showing the exterior and interior of the bucket, and the funnel, strainer, and exit tube.

Referring now to FIG. 3, a cutaway side view of the environmental waste water filtering system 100 is shown. The bucket 110 is shown to have a height 130, which is 14 inches (14") in one embodiment, but may be any other height that will accommodate fluid introduced into the bucket 110. The top opening 118 is shown to have a top width 132, which may be any width sufficient to allow the introduction of fluid containing particulates into the bucket 110. The bottom opening has a bottom width 134, which may be any width that allows the bucket 110 to sit upright on a floor while fluid passes through the bucket 110. In one embodiment, the top width 132 is eleven-and-three-quarters inches (11¾") and the bottom width 134 is ten-and-one-half inches (10½"), with the bucket 110 thus having a slight taper. An advantage of the tapered shape of the bucket 110 is ease of removal from injection molds that may be used in manufacturing of bucket 110. The tapered shape of the bucket 110 also allows the funnel 124 to sit right at the desired position in the bucket 110. The flange 125 of the funnel 124 would be tapered also in order to sit flush against the inside surface 114 of the bucket 110. As mentioned previously, the flange 125 may also be further affixed to the bucket 110 using epoxy, rivets, or other adhesive or fasteners known in the art.

In another embodiment, however, the bucket 110 is cylindrical, having the bottom width 134 equal to the top width 132. The bucket 110 may also have other shapes. In preferred embodiments, the bucket 110 has a circular cross-section, and the top width 132 and the bottom width 134 are the diameter at the top opening 118 and the bottom opening 122, respectively. A square cross-section would result in a wall-to-wall distance for the widths 132 and 134, and other cross-sections may have multiple top widths 132 and bottom widths 134.

As can be seen in FIG. 3, the exit tube 126 extends a distance 136 from the bottom opening 122 of the bucket 110. The distance 136 can be any distance that allows the exit tube 126 to be inserted into a drain. In preferred embodiments the distance 136 is between two inches (2") and three inches (3"). Alternatively, the distance 136 may be zero inches (0") or any other distance appropriate to the particular circumstances in which the environmental waste water filtering system 100 is to be used.

The inside surface 114 of the bucket 110 defines a fluid debris chamber 138, at the bottom of which is a conical-shaped funnel portion (or funnel) 124 which tapers down to a neck 140 leading to the exit tube 126. The exit tube may have any width that allows fluid to pass through the exit tube 126 while also allowing the exit tube 126 to be inserted into a drain. In one embodiment, the exit tube is two inches (2") wide.

In the neck 140 is a strainer 142, which comprises a mesh screen. In one embodiment, the mesh screen of the strainer 142 has square openings about one-eighth inch (⅛") wide each. Alternatively, the openings of the strainer 142 may be any other size or shape that stops particulate matter while allowing fluid to pass through the openings.

FIG. 4 shows a top view of the environmental waste water filtering system 100, showing the top opening 118 of the bucket 110 and the funnel 124. In FIG. 4 it can be seen that the strainer 142 comprises a mesh screen of square openings. In another embodiment, the openings of strainer 142 are hexagonal instead of square.

Figure 5:
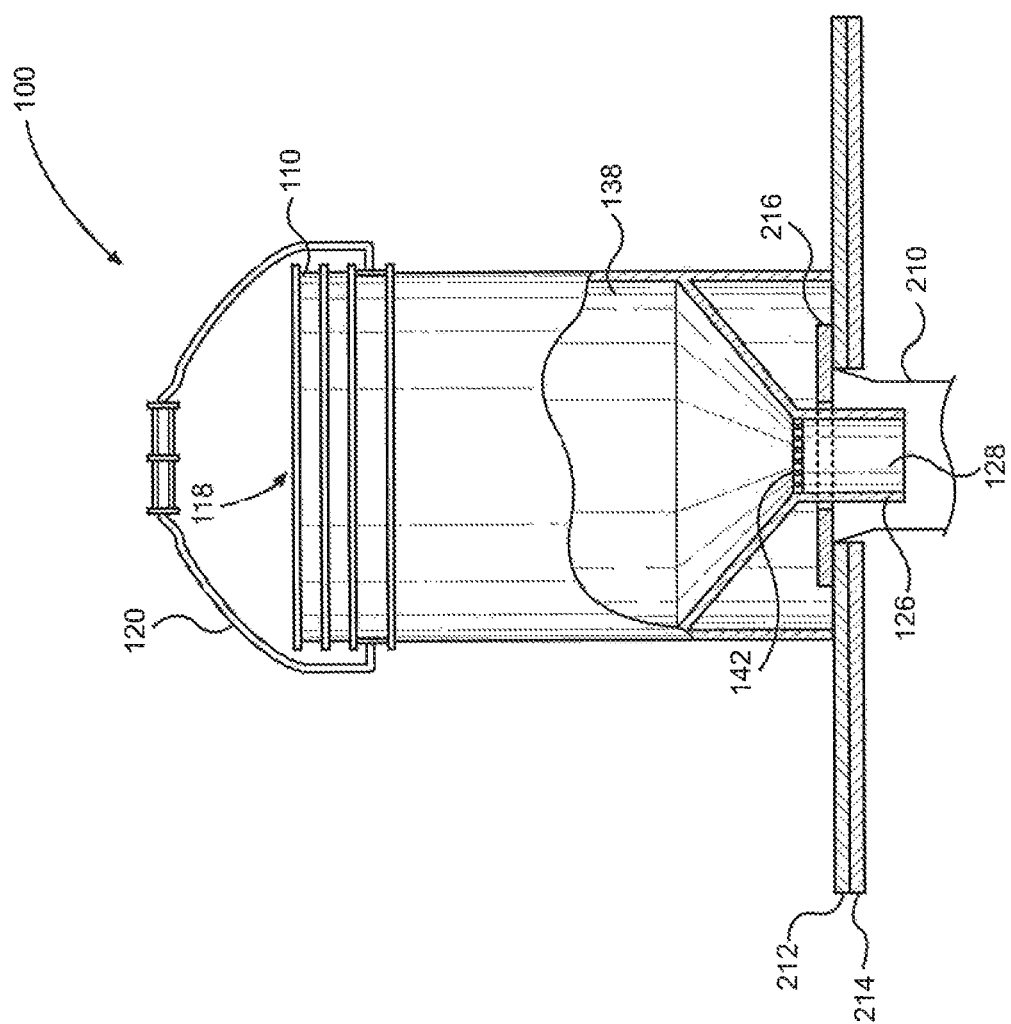
FIG. 5 is a cutaway side view of the environmental waste water filtering system of the present invention, showing the invention placed for use on a floor with a drain.

FIG. 5 is a cutaway view of the environmental waste water filtering system 100 showing the bucket 110 placed over a drain 210. One use for the environmental waste water filtering system 100 is while laying tile. In this usage scenario, the tile would be laid on top of a backerboard 212 placed over a subfloor 214. If drain 210 is a toilet drain, the bottom width 134, along with the positioning of the exit tube 126 and the conical shape of the funnel 124 allow the bucket 110 of the environmental waste water filtering system 100 to be placed over the drain 210 without sitting on or otherwise touching a toilet flange 216 which may be present.

In use, waste water containing particulate matter would be poured into the fluid debris chamber 138 through the top opening 118 of the bucket 110. The fluid would be funneled through the strainer 142, where the particulate matter would be filtered out and remain in the bucket 110. The fluid, now free of particulate matter, would continue to flow through the exit tube 126, out the exit 128, and into the drain 210. The collected particulate matter, remaining in the bucket 110, could then be disposed in an appropriate manner.

Figure 7:
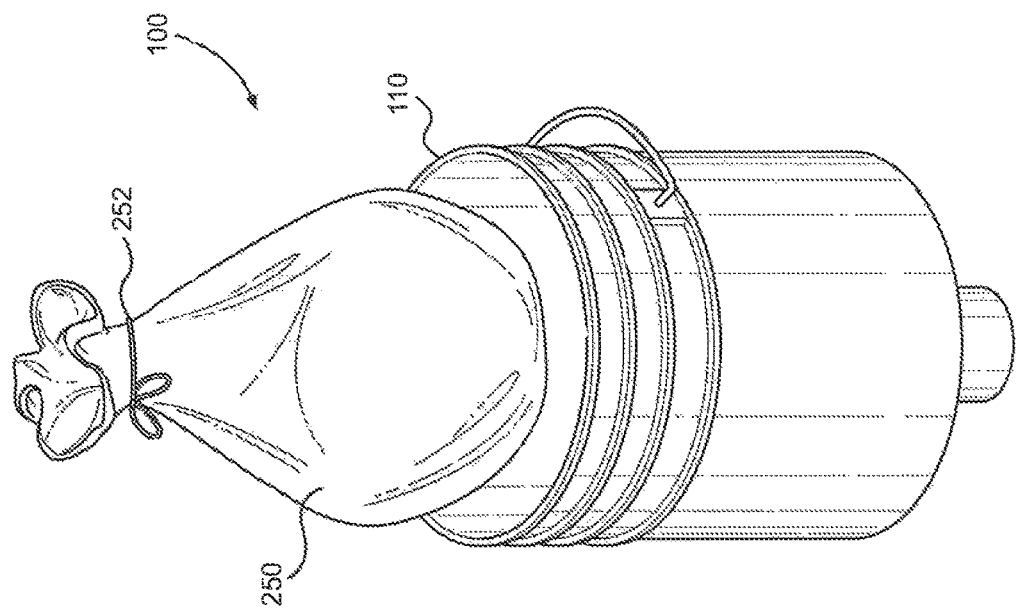
FIG. 7 is another top perspective view of the environmental waste water filtering system of the present invention, showing the straining filter bag with its opening dosed with the drawstring, and showing the bag removed from the fluid debris chamber for disposal of the bag and the debris contained in the bag.
Figure 6:
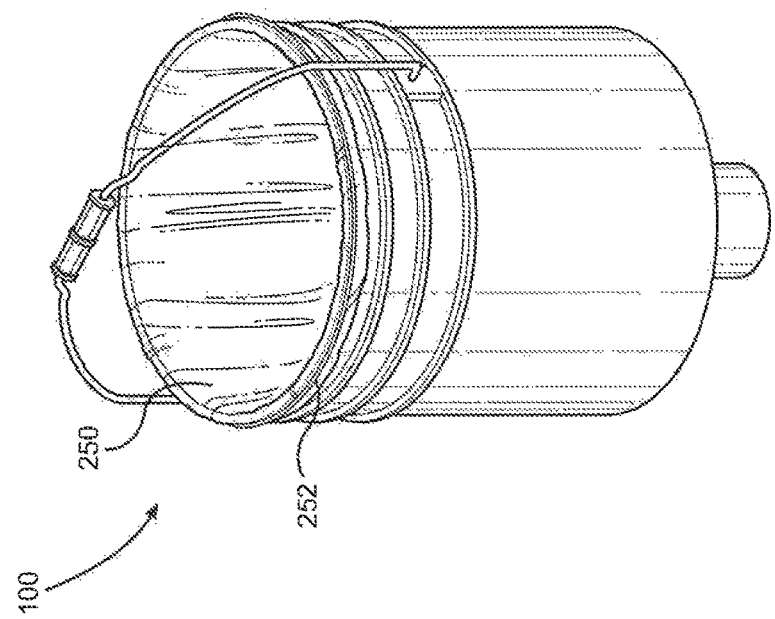
FIG. 6 is a top perspective view of the environmental waste water filtering system of the present invention, showing the addition of a straining filter bag covering the inner wall of the fluid debris chamber and having a drawstring securing the bag's opening folded outwards over the top of the bucket.

As shown in FIG. 6, in addition to the straining capabilities of the strainer 142, a straining filter bag 250 may be positioned in the fluid debris chamber 138 so that even finer particulate matter would be captured. The straining filter bag 250 can generally stop finer particulate matter than the strainer 142 alone. The environmental waste water filtering system 100 can be used with or without the straining filter bag 250, depending on the size of the particles of particulate matter that the user wishes to catch. As shown in FIG. 6, the straining filter bag 250 has an opening that can be folded over the top opening 118 of the bucket 110 to keep the straining filter bag 250 open. The straining filter bag 250 may have a feature for securing the bag opening about the top opening 118 of the bucket 110, such as a drawstring 252. Alternatively, other devices may be used to secure the bag opening about the top opening 118 of the bucket 110, such as elastic, clips, or other devices. The straining filter bag 250 may also be used without a feature for securing the bag opening to the top opening 118 of the bucket 110. In a preferred embodiment, the straining filter bag 250 may be a paint straining bag used for straining paint for spray application in the painting industry, FIG. 7 is a perspective view of the environmental wastewater filtering system 100, showing the straining filter bag 250 with its opening now closed with the drawstring 252, and showing the straining filter bag 250 removed from the fluid debris chamber 138 for disposal of the straining filter bag 250 and the debris contained in the bag. When using the straining filter bag 250, once the fluid drains through the straining filter bag 250, through the strainer 142, and into the drain 210, the straining filter bag 250 can be removed from the bucket 110, tied to prevent debris from leaving the straining filter bag 250, and the debris can thus be disposed of properly. Alternatively, the straining filter bag 250 may be of a type that is reusable, which can be emptied of debris and cleaned for reuse. Thus the environmental waste water filtering system 100 protects the environment from contamination by debris and finer particulate matter that might otherwise be dumped on the ground. The environmental waste water filtering system 100 also protects drains from being blocked by buildup of debris and finer particulate matter that might otherwise pass into the drains.

What is claimed is:

1. An environmental waste water filtering system, comprising:
   a bucket comprising:
      a wall having an outside surface and an inside surface defining an interior of said bucket,
      a top opening at a first end of the bucket configured to allow the introduction of fluid containing particulates into the bucket, said top opening having a top opening width, and
      a bottom opening at a second end of the bucket opposite said first end of the bucket, said bottom opening having a bottom opening width smaller than said top opening width; and
   a funnel comprising an upper circumference at a top of the funnel, a flange extending downward from said upper circumference, a conical funnel portion tapering down to a neck, a filtering mechanism in said neck, and an exit tube,
   wherein said funnel is attached to said interior of said bucket such that said flange sits flush against said inside surface, and
   wherein said funnel is in fluid communication with said interior of said bucket, and said exit tube is in fluid communication with said neck of said funnel, whereby fluid flows from the interior of said bucket through said funnel and out said exit tube.

2. The environmental waste water filtering system as recited in claim 1, wherein said filtering mechanism comprises a strainer.

3. The environmental waste water filtering system as recited in claim 1, wherein said funnel sits in said bucket at a position in which said exit tube extends below said bottom opening of said bucket.

4. The environmental waste water filtering system as recited in claim 3, wherein the bottom opening width, the shape of the funnel, and the position of the exit tube allow the bucket to be placed over a drain having a toilet flange without touching the toilet flange.

5. The environmental waste water filtering system as recited in claim 4, wherein the exit tube extends between two inches and three inches into the drain.

6. The environmental waste water filtering system as recited in claim 3, wherein said exit tube extends approximately 3 inches below said bottom opening of said bucket.

7. The environmental waste water filtering system as recited in claim 3, wherein said flange is further affixed to said inner wall using an affixing material.

8. The environmental waste water filtering system as recited in claim 7, wherein said affixing material is epoxy.

9. The environmental waste water filtering system as recited in claim 7, wherein said affixing material comprises a plurality of rivets.

* * * * *